United States Patent [19]

Coutant

[11] Patent Number: 4,506,564
[45] Date of Patent: Mar. 26, 1985

[54] AUTOMATIC TRANSMISSION CONTROL PRESSURE REGULATOR

[75] Inventor: Alan R. Coutant, Chillicothe, Ill.

[73] Assignee: Ford Motor Company, Dearborn, Mich.

[21] Appl. No.: 295,032

[22] Filed: Aug. 21, 1981

[51] Int. Cl.³ .............................................. B60K 41/10
[52] U.S. Cl. ........................................ 74/869; 74/865; 74/868
[58] Field of Search ............... 74/862, 863, 865, 867, 74/868, 869; 251/63.4

[56] References Cited

U.S. PATENT DOCUMENTS

| | | | |
|---|---|---|---|
| 3,309,939 | 3/1967 | Pierce | 74/864 |
| 3,393,585 | 7/1968 | Pierce | 74/864 |
| 3,505,906 | 4/1970 | Lemieux | 74/869 |
| 3,605,525 | 9/1971 | Pierce et al. | 74/869 |
| 3,613,484 | 10/1971 | Pierce et al. | 74/864 |
| 3,709,066 | 1/1973 | Burcz | 74/869 |
| 3,714,836 | 2/1973 | Pierce et al. | 74/869 |
| 4,314,488 | 2/1982 | Lauven | 74/867 |
| 4,331,046 | 5/1982 | Leonard et al. | 74/867 |
| 4,347,764 | 9/1982 | Lauven | 74/868 |

Primary Examiner—Leslie A. Braun
Assistant Examiner—Joseph M. Rolnicki
Attorney, Agent, or Firm—Donald J. Harrington; Keith L. Zerschling

[57] ABSTRACT

A fluid pressure regulator valve for use in an automatic power transmission control system for an automotive vehicle having a throttle controlled engine and a transmission throttle valve system connected to the engine throttle, a control pressure booster forming a part of the regulator valve for increasing the regulated line pressure in the control system during operation of the transmission in selected operating modes, a hydraulic connection between the transmission throttle valve and the regulator valve for increasing the regulated line pressure upon an increase in engine torque and means for changing the operating pressure level upon a failure of the mechanical connection between the engine throttle and the transmission throttle valve so that the regulator valve operates at a higher level thereby maintaining adequate pressure on the friction elements of the transmission mechanism.

2 Claims, 3 Drawing Figures

AUTOMATIC TRANSMISSION CONTROL PRESSURE REGULATOR

GENERAL DESCRIPTION OF THE INVENTION

My invention comprises improvements in an automatic control valve system of the kind shown in Pierce U.S. Pat. No. 3,309,939 and Pierce et al U.S. Pat. No. 3,613,484 as well as in the transmission control system disclosed in pending application Ser. No. 176,948 filed by D. A. Whitney et al on Aug. 11, 1980 for an automatic transaxle control system. Both of these patents as well as the application are assigned to the assignee of this invention The transmission control systems shown in U.S. Pat. Nos. 3,309,939 and 3,613,484 include a transmission throttle valve that is used to develop a pressure signal that is proportional in magnitude to engine torque. This torque signal is obtained by a movable valve spool that modulates control pressure in response to changes in the force applied to the throttle valve spool by a diaphragm assembly. One side of the diaphragm assembly is connected pneumatically to the engine intake manifold. Thus the pressure level maintained by reason of the modulating action of the throttle valve spool is dependent upon the magnitude of the intake manifold pressure which in turn is an indicator of engine torque.

In contrast to the throttle valve systems of U.S. Pat. Nos. 3,309,939 and 3,613,484, the throttle valve system shown in the pending application has a mechanical linkage between the engine carburetor throttle and the pressure modulating throttle valve spool in the transmission control system. In both arrangements; that is, in the pneumatic arrangement and the mechanical arrangement, the throttle valve is effective to transmit a torque signal pressure to a main pressure regulator valve so that the regulated pressure in the control system for the transmission is increased upon increase in engine torque and is decreased as engine torque is reduced. This allows the control system to be maintained at a level that is sufficient to prevent slippage of the friction clutch and brake members in the transmission and to prevent excessive pressure from developing in the clutches and brakes that would result in overloading of the torque transmitting members and harshness in ratio changes. The use of excessive pressures also would overload the transmission pump and would result in an unnecessary parasitic horsepower loss that would affect adversely engine fuel economy.

In the mechanical throttle valve system the transmission throttle valve pressure would tend to decrease to zero or to a value near zero in the event of a failure in the mechanical linkage between the engine throttle and the transmission throttle valve. If that failure occurs during torque delivery through the driveline, excessive slippage of the friction elements of the clutches and brakes in the transmission would occur. My present invention is intended to cause an increase in the regulated line pressure maintained in the control valve system following a loss of throttle pressure. This is done by providing the usual hydraulic connection between the throttle valve and the regulator valve to change the regulated pressure level in response to changes in throttle pressure. Additional means are provided for overruling the effect of the throttle valve on the transmission control circuit pressure level maintained by the regulator valve pressure when throttle valve is reduced to zero or to a value near zero.

GENERAL DESCRIPTION OF THE INVENTION

Figure 1:
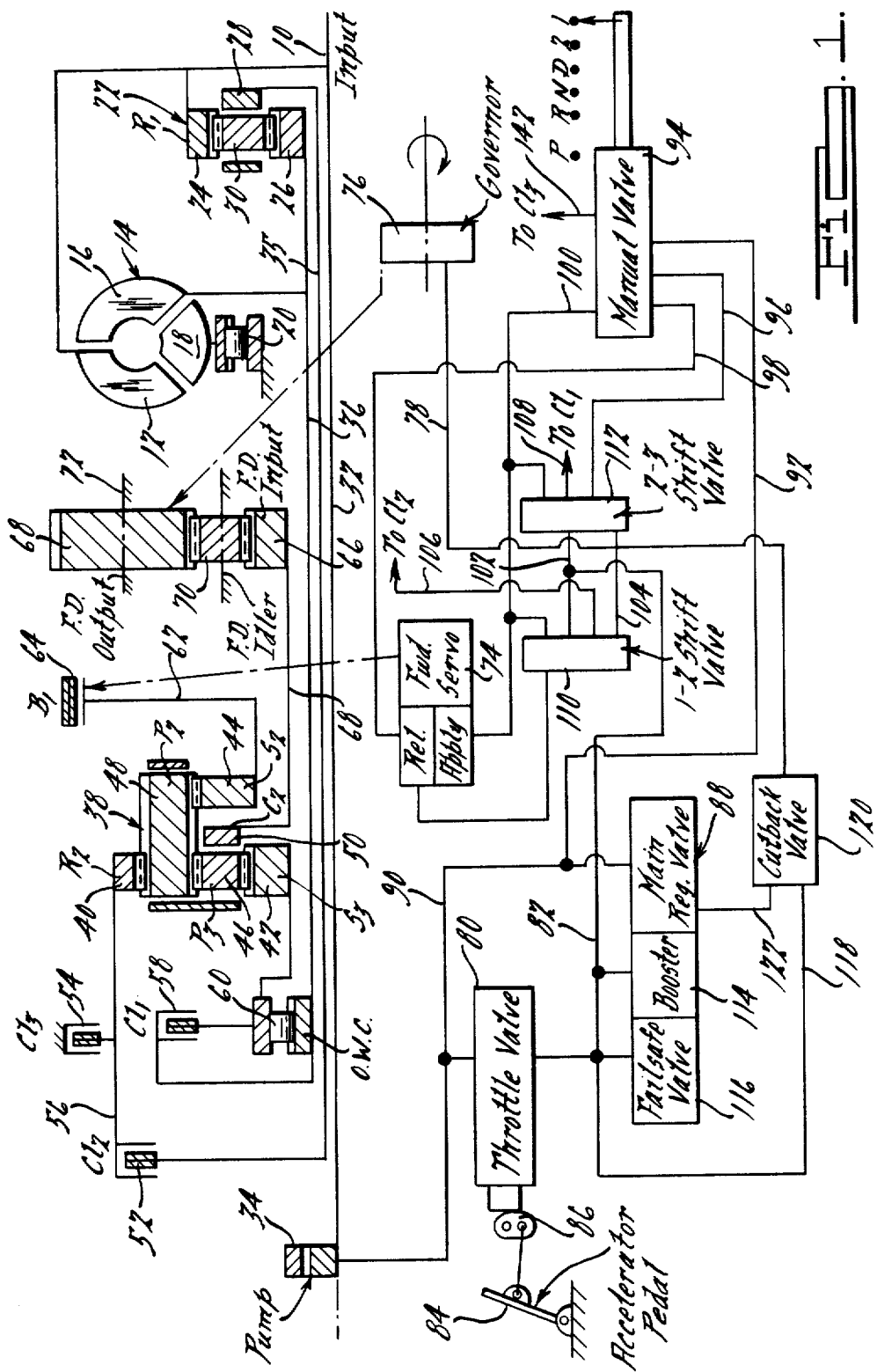
FIG. 1 is a schematic representation of the gearing for an automatic power transmission mechanism and the associated control valve system which is capable of embodying the improvements of my invention.

An engine driven crankshaft 10 is connected to the impeller 12 of a hydrokinetic torque converter 14. Converter 14 includes a turbine 16 and a stator 18 arranged in toroidal fluid flow relationship with respect to the impeller 12. Stator 18 is supported on a stationary sleeve shaft and an overrunning brake 20 anchors the stator against rotation in one direction while permitting freewheeling motion in the direction of rotation of the engine.

A simple planetary torque splitter gear unit 22 is located between the engine and the converter 14. Gear unit 22 includes a ring gear 24, a sun gear 26, a carrier 28 and planet pinions 30 journalled on the carrier 28 in meshing engagement with the ring gear 24 and the sun gear 26. Ring gear 24 is connected directly to the engine crankshaft driven input shaft 10. A central shaft 32 extends concentrically through the converter and through the gearing and is connected drivably to a positive displacement pump 34 which forms a part of the control valve system which I will describe.

Surrounding the pump drive shaft 32 is a first sleeve shaft 35 connected drivably to carrier 28 and a second sleeve shaft 36 connected to turbine 16 and to sun gear 26 of the gear unit 22. Sleeve shafts 35 and 36 act as dual torque input shafts for compound planetary gearing indicated generally by reference character 38. Gearing 38 comprises a ring gear 40, a small pitch diameter sun gear 42, a large pitch diameter sun gear 44, short planet pinions 46 and long planet pinions 48. The pinions 46 and 48 are carried by a carrier 50 so that they mesh with each other. Pinions 48 mesh with the ring gear 40 and with the sun gear 44. Pinions 46 mesh with the sun gear 42. Intermediate clutch 52 can be applied selectively to connect the carrier driven shaft 35 to the ring gear 40. Brake 54 is applied during reverse drive when ring gear 40 acts as a reaction point. Clutch 52 is applied during operation in the intermediate and high speed ratios.

Sun gear driven shaft 36 is adapted to be connected selectively to sun gear 42 through friction clutch 58 which is applied during operation in reverse, third speed ratio and first speed ratio. Overrunning clutch 60 is arranged in parallel disposition with respect to the friction clutch 58 to connect the sun gear shaft 36 to the sun gear 42 during operation in the first speed ratio.

Sun gear 44 is connected to brake drum 62 about which is positioned brake band 64 which is applied during operation in the first and second forward driving speed ratios.

Final drive input gear 66 is connected to sleeve shaft 68 which is driven by the carrier 50. Final drive output gear 68 is adapted to be connected to a differential and axle assembly as indicated in the above-mentioned application Ser. No. 176,948, filed by D. A. Whitney et al. An idler 70 connects drivably the final drive gears 66 and 68, the latter being journalled for rotation about its stationary axis 72.

Figures 2, 3:
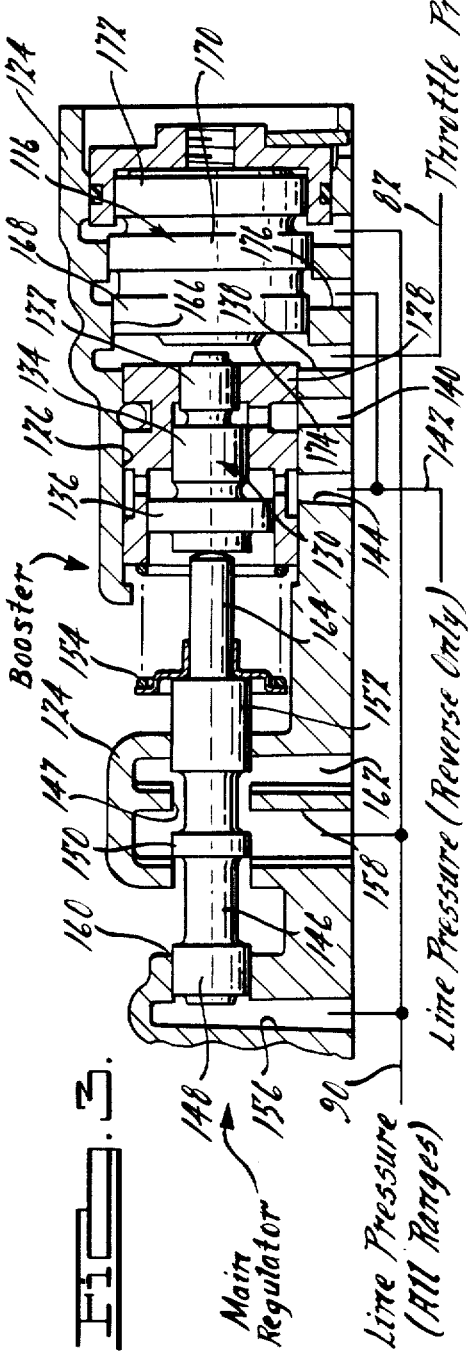
FIG. 2 is a chart that shows the clutch and brake engagement and release pattern for the gearing of FIG. 1.
FIG. 3 is a cross-sectional view of a preferred embodiment of a regulator valve for use in the control system shown schematically in FIG. 1.

In FIG. 2 I have shown the clutch and brake engagement and release pattern for effecting the various drive ratios for the gearing of FIG. 1. For purposes of relating the chart of FIG. 2 to the schematic drawing of FIG. 1, clutch 52 is identified by symbol $CL_2$, clutch 58 is identified by symbol $CL_1$, clutch 54 is identified by symbol $CL_3$, brake band 64 is identified by symbol $B_1$ and the overrunning clutch 60 is identified by the symbol O.W.C.

For the gear data indicated in FIG. 2 the ratios have been computed and listed in the first column on the left hand side of FIG. 2 for each of the drive ranges and each of the ratios. For purposes of reading the chart of FIG. 2, ring gear 24 of the torque splitter gear unit 22 is designated by symbol $R_1$, the sun gear 26 of the split torque gear unit has been designated by the symbol $S_1$, the pinions for the torque splitter gear unit have been identified by the symbol $P_1$, ring gear 40 of the main gearing has been identified by the symbol $R_2$, sun gear 44 has been identified by the symbol $S_2$, small sun gear 42 has been identified by the symbol $S_3$, long planet pinions 48 have been identified by the symbol $P_2$ and short planet pinions 46 have been identified by the symbol $P_3$.

The clutches and brakes of the gearing shown schematically in FIG. 1 are applied and released by an automatic control valve circuit which includes a forward drive fluid pressure operated servo 74 for engaging and releasing brake band 64. A fluid pressure governor 76 is adapted to develop a governor pressure signal in governor passage 78. It is driven by the final drive output gearing as shown schematically in FIG. 1 at 68.

The components of the control system shown in FIG. 1 are rather conventional components and a complete description of them will not be made here. For a full description of their construction and their mode of operation, reference may be made to co-pending application Ser. No. 176,948, filed by D. A. Whitney et al or to either of U.S. Pat. Nos. 3,309,939 or 3,613,484.

The control system in FIG. 1 includes a throttle valve 80 that receives control pressure from the engine driven transmission pump 34 and modulates it to produce a throttle pressure signal in passage 82 that is proportional in magnitude to engine torque. That torque sensitive signal is obtained by establishing a connection between the internal combustion engine throttle and the movable elements of the throttle valve 80. One such connection is illustrated schematically in FIG. 1, which shows an engine accelerator pedal 84 connected to the throttle valve 80 through the mechanical linkage that includes a calibrated cam 86.

Control pressure from the passage 90 is distributed through passage 92 to the manual valve 94. Manual valve 94 can be adjusted by the operator to any one of several drive mode positions which are indicated by symbols 1, 2, D, N, R and P. These symbols represent respectively the positions of the manual valve to establish a first drive mode, the intermediate drive mode, the automatic drive range in which 3 forward drive ratios are available, the neutral condition, the reverse drive mode and the park condition. Control pressure is distributed selectively to the 2-3 shift valve through passage 96 by the manual valve 94. Control pressure also is distributed by the manual valve 94 to the passage 98 which extends to the forward brake servo 74 thereby pressurizing the release side of the servo. The apply side of the servo 74 is pressurized as control pressure is distributed by the manual valve 94 to the passage 100. Control pressure is distributed also by the passage 100 to the 1-2 shift valve and the 2-3 shift valve.

The throttle pressure signal in passage 82 is distributed to passage 102 and hence to each of the shift valves. It establishes on the shift valves a pressure signal force that opposes the force of governor pressure which is distributed to the shift valves through passage 104, the latter communicating with governor pressure passage 78. The 1-2 shift valve responds to the governor pressure signal and the throttle valve pressure signal to distribute control pressure from passage 100 to passage 106 which extends to the clutch $CL_2$, also designated by the reference character 52. Similarly, the 2-3 shift valve responds to the opposing pressure signal forces in passages 102 and 104 to distribute control pressure from passage 100 to passage 108 which extends to the clutch $CL_1$, also designated by the reference character 58.

In FIG. 1 the 1-2 shift valve is indicated by reference character 110 and the 2-3 shift valve is indicated by reference character 112.

The main regulator valve 88 is part of an assembly that includes a pressure booster 114. Throttle pressure from throttle pressure signal passage 82 acts on the booster 114 to increase the regulated circuit pressure level upon an increase in engine torque. The regulator includes also a failsafe valve 116 which also communicates with the throttle pressure signal in passage 82. It responds to a decrease in that signal to effect an increase in the regulated pressure level. This characteristic will be described with reference to FIG. 3.

Throttle pressure is distributed also from passage 82 to passage 118 and to a line pressure cutback valve 120. Governor pressure also is distributed to the cutback valve through signal passage 78. Upon an increase in the speed of the vehicle for any given engine torque, the cutback valve responds by appropriately controlling transfer of throttle pressure from passage 118 to passage 122 extending to the main regulator valve 88.

In FIG. 3 the valve housing is shown at 124. It has a valve bore 126 that receives valve sleeve 128, which in turn slidably receives multiple diameter boost valve spool 130. Spool 130 has multiple lands of increasing diameter as shown at 132, 134 and 136. The right hand end of valve land 132 as viewed in FIG. 3 communicates with throttle pressure valve port 138 which receives fluid from throttle pressure passage 82. Lands 132 and 134 define a differential area that is subjected to cutback valve pressure from passage 122, port 140 communicating with passage 122 for this purpose. Lands 136 and 134 define a differential area that communicates with reverse line pressure passage 142 through port 144. Passage 142 is pressurized whenever the manual valve 94 is moved to the reverse position "R".

Main regulator valve element 146 which is slidably received in valve bore 147 in the valve body 124 has three spaced valve lands 148, 150 and 152. Valve element 146 is biased in a left hand direction as seen in FIG. 3 by valve spring 154 seated on valve sleeve 128. Line pressure from passage 90 is distributed to the left hand side of the valve land 148 through port 156. Port 158 provides communication between passage 90 and the space between valve lands 150 and 152. Land 150 controls the degree of communication between port 158 and exhaust port 160 formed in the valve body 124. The torque converter and lubrication circuit for the transmission of FIG. 1 communicates through internal passage structure with port 162 as the land 152 controls the degree of communication between passage 90 and the passage 162 thus there are two regulating valve lands on the valve spool 146, one for the converter and lube circuit and the other for the control circuit for the clutches and brakes.

When the throttle pressure in passage 82 increases, the force on the right hand end of the land 132 increases. This force is transmitted to the regulating valve spool through valve stem 164 which engages the boost valve 130. An increase in throttle pressure then will result in an increase in regulated line pressure in passage 90. The presence of reverse line pressure in passage 142 also will effect an increase in the regulator pressure level because of the addition of a pressure force on the differential area of lands 136 and 134 during reverse drive operation.

When the cutback valve functions upon an increase of the vehicle speed beyond a given point, pressure distribution through passage 122 to the port 140 is interrupted and this subtracts one pressure force from the boost valve 130 thereby causing a decrease in the regulated line pressure. At low speed when line pressure is needed to maintain clutch and brake capacity, cutback pressure force acts on the differential area of lands 134 and 132.

Failsafe valve 116 is located in a large diameter bore 166 in the valve body 124. Valve 116 includes three valve lands 168, 170 and 172. The differential area defined by lands 170 and 172 communicates with the line pressure passage 90 so that a pressure force normally acts in a left hand direction on the valve 116. This pressure force can be transmitted to the booster valve 130 when the left hand end 174 of the valve 116 engages the right hand end of the booster valve 130. Throttle pressure from passage 82, which normally acts on the right hand end of the valve land 132, acts on the left hand end of the valve land 168 of the valve 116. This normally tends to hold the valve 116 in a right hand direction out of engagement with booster valve 130. The effect of the throttle pressure in passage 82 is complemented by the pressure force acting on the differential area of lands 170 and 168 due to the presence of pressure in passage 142 during reverse drive. Passage 142, in addition to communicating with port 144, communicates with port 176 of the valve 116.

During normal operation of the control system, throttle pressure in passage 82 is sufficient to hold the valve 116 out of engagement with the booster valve 130. In the event of a malfunction of the linkage mechanism between the accelerator pedal and the transmission, throttle valve throttle pressure in passage 82 will tend to drop to zero or to a value near zero. This loss of throttle pressure will not result, however, in an undesirable decrease in line pressure below the value necessary to maintain clutch and brake capacity because the valve 116 then will tend to shift in a left hand direction and engage the booster valve 130 so that pressure forces acting on the differential area of lands 170 and 172 will be transmitted directly to the booster valve 130 and replace the lost throttle pressure force.

Having described a preferred embodiment of my invention, what I claim and desire to secure by U.S. Letters Patent is:

1. In an automatic power transmission mechanism having multiple ratio gearing connecting drivably a driving shaft with a driven shaft;
    friction clutch and brake means selectively engageable to establish various torque transmitting ratios in said gearing;
    fluid pressure operated clutch and brake servos for actuating and releasing said clutch and brake means;
    a positive displacement pump;
    a control valve system for controlling pressure distribution from said pump to said clutch and brake servos including a fluid pressure regulator valve assembly for maintaining a regulated circuit pressure level in said control valve system;
    shift valve means for distributing selectively pressure from said regulator valve assembly to said servos;
    a source of a speed pressure signal;
    throttle valve means for producing a throttle pressure signal proportional in magnitude to engine torque;
    means for distributing said signals to said shift valve means to effect ratio changes;
    said throttle valve means being in communication with said regulator valve means to effect an increase in the regulated circuit pressure level upon an increase in engine torque; and
    booster valve means forming a part of said regulator valve assembly in communication with said throttle valve means for establishing a pressure force on said regulator valve means that compensates for a reduction in throttle pressure due to malfunctioning of the throttle valve assembly thereby maintaining a high threshold value for the regulated circuit pressure that is sufficient to maintain clutch and brake capacity and to avoid friction element slippage in said clutch and brake means.

2. The combination as set forth in claim 1 wherein said regulator valve means includes a main regulator valve spool adapted to modulate the pressure of said pump to produce a regulated circuit pressure;
    said spool having a valve spring acting thereon in one direction and a pressure land thereon subjected to feedback pressure from said control circuit to establish a balanced regulating condition;
    said booster valve means being arranged in alignment with said regulator valve spool on one side thereof;
    a pressure land on said booster valve means in communication with said throttle valve means whereby a throttle pressure force is developed on said booster valve means that is transmitted to said regulator valve spool to cause said regulator valve means to regulate at a higher pressure level upon increase in engine torque;
    said booster valve means including a throttle pressure signal sensitive valve element responding to a pressure force of said control pressure to augment the effect of said booster valve means and responding to the throttle pressure signal to oppose the force of the control pressure acting on said booster valve means whereby said throttle pressure signal sensitive valve element is effective to augment the effect of said booster valve means upon loss of throttle pressure signal.

* * * * *